United States Patent [19]

Gates

[11] Patent Number: 4,931,818
[45] Date of Patent: Jun. 5, 1990

[54] CAMERA VIEW FINDER
[75] Inventor: Richard A. Gates, Hilton, N.Y.
[73] Assignee: Eastman Kodak Company, Rochester, N.Y.
[21] Appl. No.: 372,233
[22] Filed: Jun. 26, 1989

Related U.S. Application Data

[63] Continuation of Ser. No. 255,091, Oct. 7, 1988, abandoned.
[51] Int. Cl.⁵ .................. G03B 13/10; G02B 15/04
[52] U.S. Cl. ................................ 354/222; 350/422
[58] Field of Search ............... 354/195.1, 195.12, 199, 354/221, 222, 219, 223, 224, 225; 350/252, 254, 422

[56] References Cited

U.S. PATENT DOCUMENTS

| | | | |
|---|---|---|---|
| 2,187,246 | 1/1940 | Nerwin | 354/222 |
| 2,653,528 | 9/1953 | Mueller | 354/221 |
| 3,185,061 | 5/1965 | Westphalen | 354/195.12 |
| 3,212,422 | 10/1965 | Nerwin et al. | 354/222 |
| 3,490,844 | 1/1970 | Sapp, Jr. | 355/40 |
| 3,836,934 | 9/1974 | Suzuki et al. | 354/195.12 |
| 3,936,150 | 2/1976 | Ikeda | 350/422 |
| 4,038,673 | 7/1977 | Schroder | 354/222 |
| 4,104,663 | 8/1978 | Yamazaki et al. | 354/195.12 |
| 4,195,924 | 4/1980 | Stemme et al. | 354/195.12 |
| 4,204,760 | 5/1980 | Kobayashi | 354/195.12 |
| 4,256,396 | 3/1981 | Kawaguchi et al. | 354/222 |
| 4,277,158 | 7/1981 | Zawodny | 354/195.12 |
| 4,357,102 | 11/1982 | Taren et al. | 355/77 |

Primary Examiner—A. A. Mathews
Attorney, Agent, or Firm—James A. Smith

[57] ABSTRACT

A view finder comprises three lenses which are mounted for pivotal movement about three separate axis. Cam means are provided for moving the lenses between a viewing position and folded positions. The cam means includes a single plate movable along a rectilinear path to effect position of the lenses.

8 Claims, 3 Drawing Sheets

CAMERA VIEW FINDER

This is a continuation of application Ser. No. 255,091, filed Oct. 7, 1988 now abandoned.

CROSS REFERENCE TO RELATED APPLICATION

Reference is made to commonly assigned copending application U.S. Ser. No. 255,187 entitled CAMERA VIEW FINDER and filed concurrently herewith in the names of Richard A. Gates and Jeffrey R. Stoneham.

BACKGROUND OF THE INVENTION

The present invention relates to view finder devices for use in cameras and more particularly to an improved view finder device in which a plurality of lenses can be selectively positioned in a viewing position or optical path.

Mechanisms are know which change the magnification of a view finder in cameras having more than one photographic lens and in cameras for producing special effects such as pseudo tele or pseudo pan. However, in general, such mechanisms are complicated and capable of providing only two levels of magnification.

It is an object of the present invention to provide a compact view finder which can provide at least three levels of magnification.

SUMMARY OF THE INVENTION

In accordance with the invention, a view finder comprises three lenses which are pivotally mounted for pivotal movement about three separate axis respectively. Cam means are provided for moving the respective lenses selectively between the same viewing position and separate folded positions.

BRIEF DESCRIPTION OF THE DRAWINGS

Other objects and advantages will become apparent from the following description taken in connection with the accompanying drawings wherein.

DETAILED DESCRIPTION OF THE PREFERRED EMBODIMENT

Figure 1:
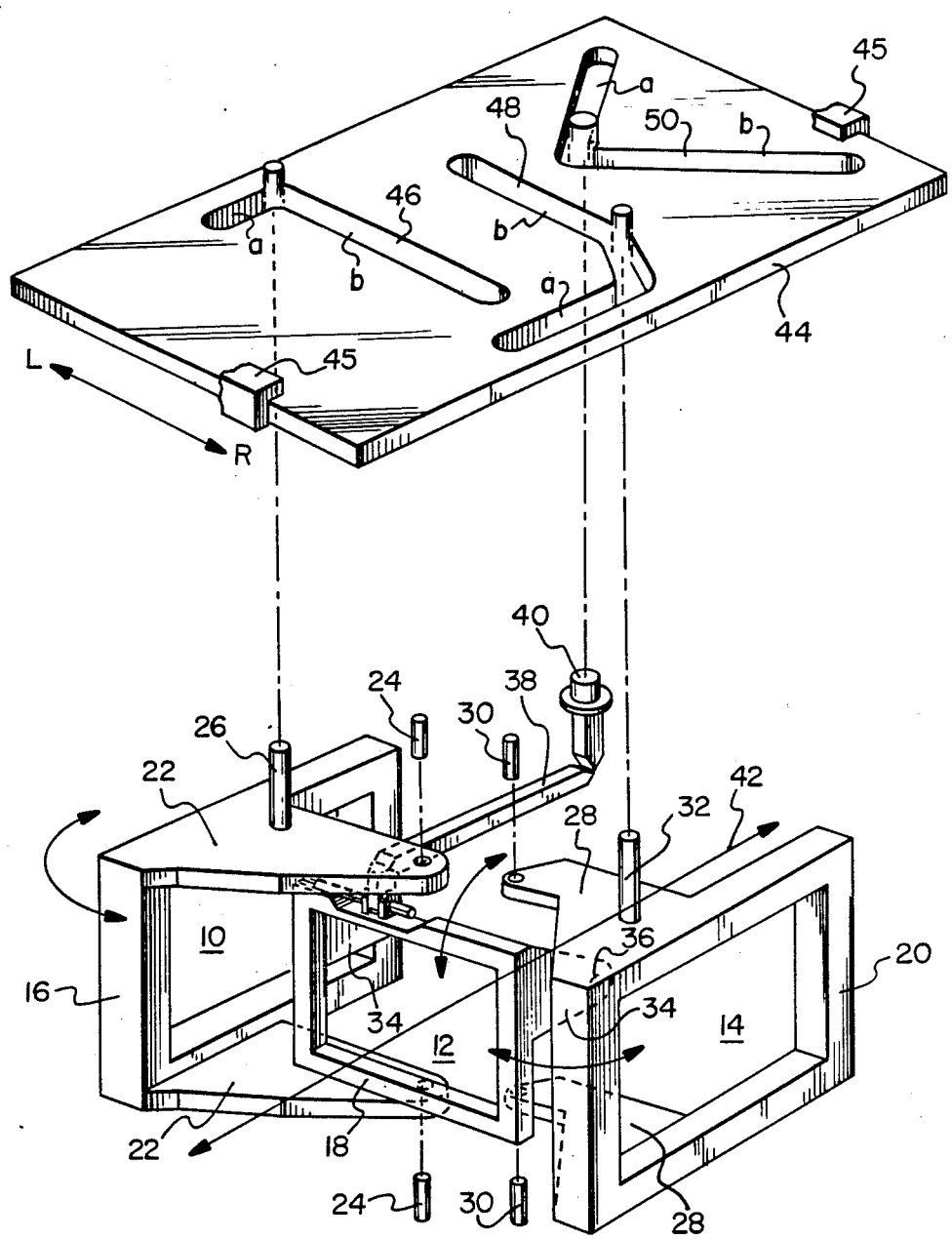
FIG. 1 is a partially exploded perspective view of a view finder device in accordance with the invention.

Referring to the drawings, there is shown a view finder device for a photographic camera. To simplify the disclosure, camera parts not necessary for an understanding of the invention have been omitted. For example, the eye lens and front element are not shown and the disclosure is limited to apparatus For moving the movable lens element.

Referring to FIG. 1 of the drawings, there is shown a view finder comprising three lenses 10, 12 and 14 mounted in frames 16, 18 and 20 respectively. In a typical pseudo tele pan camera lens 10 might be the normal view finder lens. Lens 12 might be used to provide magnification of the scene in the view finder for pseudo tele purposes and lens 14 might be used to provide panoramic views for pseudo pan purposes.

Frame 16 is of rectangular configuration and comprises a pair of flanges 22 extending from one side thereof which are pivotaly mounted on pins 24 fixed to the camera body (not shown). A third pin 26 extends from the upper flange 22 and functions as a cam pin for pivoting the frame about the axis of pins 24 as will later be described in more detail.

Frame 20, positioned in spaced parallel relationship with frame 16, is similar in configuration to frame 16 and includes a pair of flanges 28 pivotally mounted on a pair of pins 30 fixed to the camera body. A cam pin 32 extends upward from the upper flange 28 and provides a means for pivoting the frame 16 about the axis of pins 30, an axis parallel to the axis of pins 24.

The third frame 18, positioned in perpendicular relationship with frames 16 and 20, is also similarly configured and provided with a pair of spaced flanges 34 pivotally mounted on a pair of pins 36 fixed to the camera body. The frame 18 is positioned between the flanges 22 and 28 and pivots about the horizontal axis of pins 36 which axis is perpendicular to that of pins 24 and that of pins 30. An elongated cam arm 38 extending perpendicularly from the plane of frame 28 and pivotally connected to frame 28 by pin 39 is provided with an upwardly extending pin 40 at its end to provide a means for pivoting the frame 18 about the axis of pins 36. In the position of the parts shown in FIG. 1, the lens 12 is positioned in the sight plane 42 and is the operative lens.

To position the lenses, a cam plate 44 is positioned over the frame assemblage and suitably supported in guides 45 for rectilinear reciprocal movement in the direction of the arrow. The cam plate 44 is provided with three slots 46, 48 and 50. Pin 26 of frame 16 is received by slot 46, pin 40 of frame 18 by slot 50 and pin 32 of frame 20 by slot 48. Movement of the plate 44 to the right and left from the position shown in FIG. 1 will position the frame 18 out of the viewing plane and position one of the frames into the viewing plane depending upon the direction of movement as will now be described.

Figure 2:
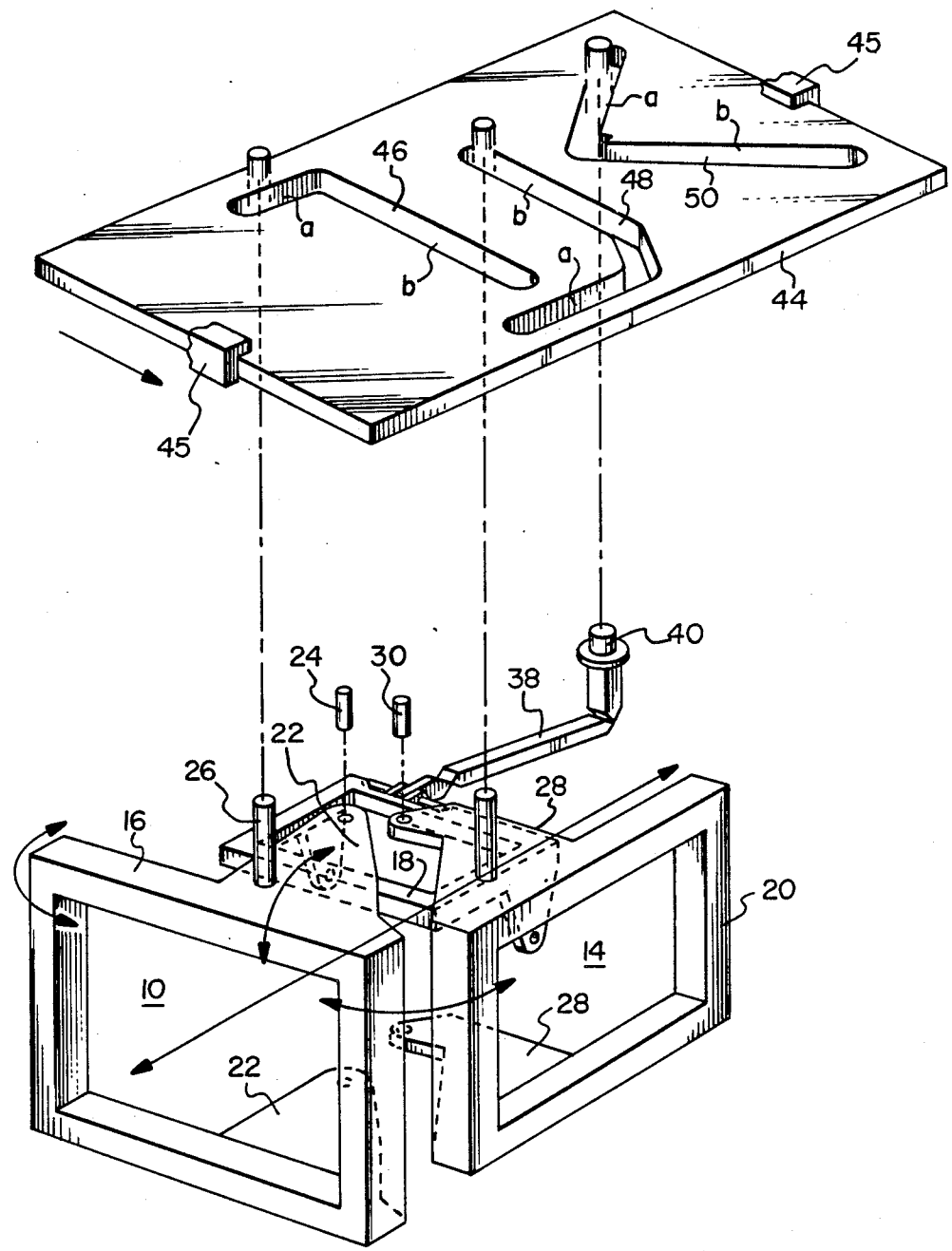
FIGS. 2 and 3 are views similar to FIG. 1 showing the parts in other positions.

If plate 44 is moved to the right (R) portion (a) of slot 46 will cam pin 26 and cause frame 16 to pivot counterclockwise to the position shown in FIG. 2. Simultaneously portion (a) of slot 50 will cam pin 40 and cause frame 18 to pivot upward to the position shown in FIG. 2. Frame 16 is thus positioned in the sight plane and frame 18 is moved out of it. During this movement, pin 32 will ride in the straight portion (b) of slot 48 and no movement of frame 20 will occur.

Figure 3:
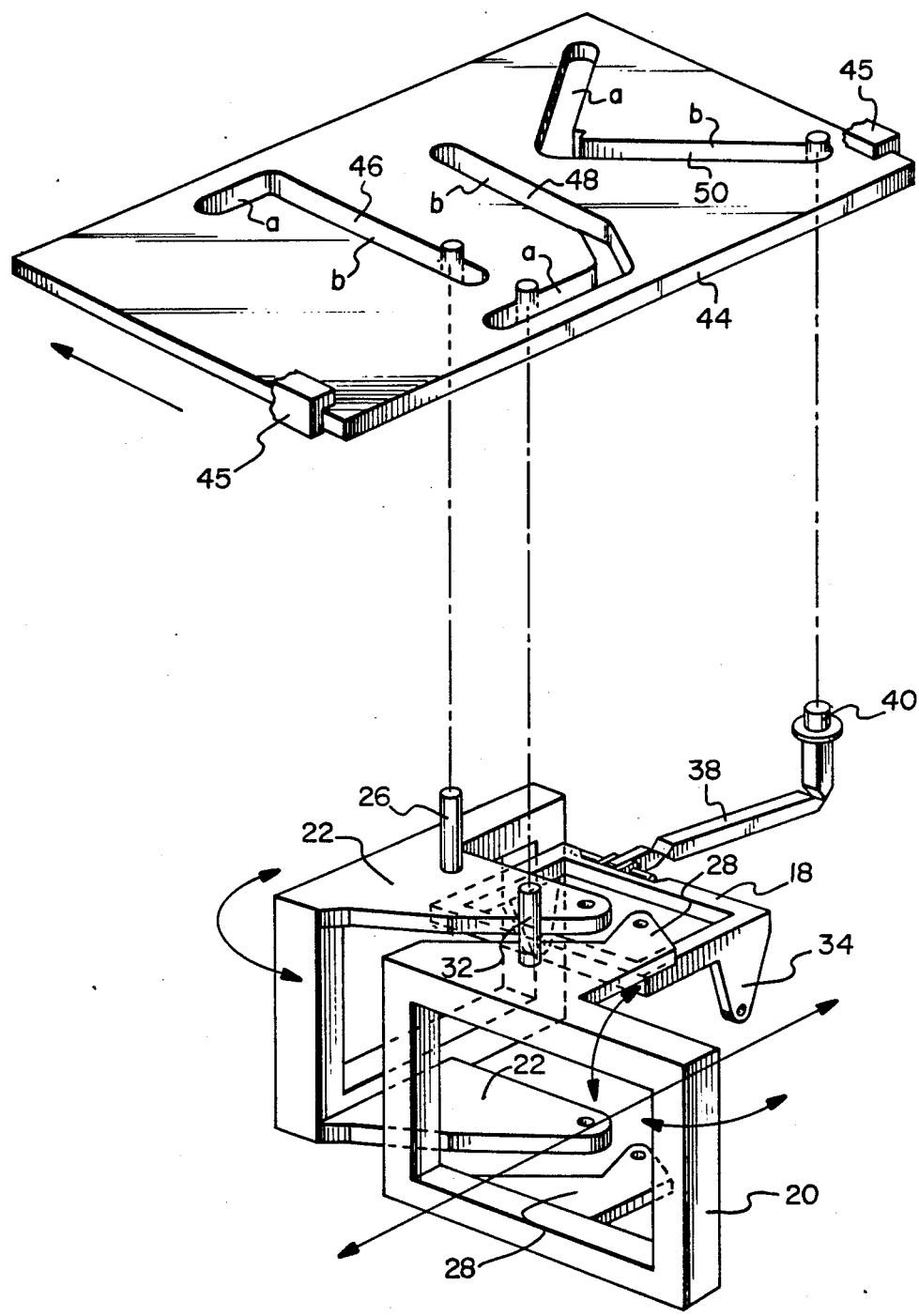

If the cam plate 44 is moved to the left from the position shown in FIG. 1, pin 40 will be cammed by portion (b) of slot 50 to again pivot frame 18 out of the sight plane. In this case, however, pin 26 will ride in the straight portion (b) of slot 46 and no movement of frame 16 will occur. However, pin 32 of frame 20 will be cammed by portion (a) of slot 48 to position frame 20 in the sight plane as shown in FIG. 3.

The disclosed view finder device thus constitutes a simple compact device for selectively positioning at least three lenses in a sight plane.

While the invention has been particularly shown and described with reference to a preferred embodiment thereof, it will be understood by those skilled in the art that various changes may be made without departing from the scope of the invention as defined by the appended claims.

I claim:

1. Apparatus for selectively positioning one of at least three lenses into an optical path, said apparatus comprising:

means for independently supporting the lenses for movement between respective first positions where they are out of the optical path and respective second positions where they are in the optical path; and cam means for selectively positioning one of said lenses in its second position and for simultaneously positioning the other of said lenses in their first positions.

2. Apparatus as claimed in claim 1 wherein said supporting means supports each of said lenses for pivotal movement between a first position wherein the lens is positioned out of the optical path and a second position wherein the lens is positioned in the optical path.

3. Apparatus as claimed in claim 2 wherein the pivotal axis of two of said lenses are parallel to each other and the pivotal axis of the other of said lenses is perpendicular to the pivotal axis of said two lenses.

4. Apparatus for selectively positioning one of a plurality of lenses into an optical path, said apparatus comprising:

first, second and third lens frames each mounted for pivotal movement about an axis between a first position wherein the lens frame is positioned out of said optical path and a second position where said lens is positioned in said optical path, the pivotal axis of said first and second frames being parallel to each other and the axis of said third frame being perpendicular to the pivotal axis of said first and second frames; and cam means for simultaneously moving one of said lens frames to its second position while moving the other of said frames to their first positions.

5. Apparatus as claimed in claim 4 wherein said cam means comprises a cam pin extending from each of said frames; and means for simultaneously moving said pins to position one of said frames to its second position and the other of said frames to their first positions.

6. Apparatus as claimed in claim 5 wherein said means for simultaneously moving said pins comprises a plate having three cam slots for receiving said cam pins respectively.

7. Apparatus as claimed in claim 6 wherein said plate is moveable between a central position wherein said third frame is in said optical path and in one direction to a second position wherein said second frame is in said optical path and in a second direction from said central position wherein said first frame is in said optical path.

8. Apparatus as claimed in claim 7 wherein said first and second frames are parallel to each other and said third frame is positioned between said first and second frames in perpendicular relationship therewith.

* * * * *

UNITED STATES PATENT AND TRADEMARK OFFICE
CERTIFICATE OF CORRECTION

PATENT NO. : 4,931,818
DATED : June 5, 1990
INVENTOR(S) : Richard A. Gates

It is certified that error appears in the above-identified patent and that said Letters Patent is hereby corrected as shown below:

Column 1, Line 20     "know" should read --known--

Column 2, Line 20     "28" should read --18--

Signed and Sealed this

Third Day of September, 1991

*Attest:*

HARRY F. MANBECK, JR.

*Attesting Officer*     *Commissioner of Patents and Trademarks*